United States Patent [19]

Treybig

[11] Patent Number: 4,613,663

[45] Date of Patent: Sep. 23, 1986

[54] THERMOPLASTIC AND THERMOSETTABLE PRODUCTS PREPARED BY REACTING NITROGEN-CONTAINING HETEROCYCLIC COMPOUNDS WITH AROMATIC ALDEHYDES

[75] Inventor: Duane S. Treybig, Lake Jackson, Tex.

[73] Assignee: The Dow Chemical Company, Midland, Mich.

[21] Appl. No.: 777,659

[22] Filed: Sep. 19, 1985

[51] Int. Cl.$^4$ ............................................. C08G 12/04
[52] U.S. Cl. .................................... 528/266; 252/518; 524/597; 528/232; 528/245; 528/269
[58] Field of Search ............... 528/232, 245, 266, 269; 524/597; 252/518

[56] References Cited

U.S. PATENT DOCUMENTS

| | | | |
|---|---|---|---|
| 3,994,862 | 11/1976 | Ropars et al. | 528/232 |
| 4,163,740 | 8/1979 | Malassine et al. | 524/284 |
| 4,360,644 | 11/1982 | Naarmann et al. | 252/390 |
| 4,362,860 | 12/1982 | Ratto et al. | 528/248 |
| 4,489,913 | 12/1984 | Gurgiolo et al. | 521/53 |
| 4,500,690 | 2/1985 | LaTulip | 525/502 |
| 4,505,844 | 3/1985 | Denisevich | 252/500 |
| 4,515,938 | 5/1985 | Swearingen et al. | 528/252 |
| 4,525,573 | 6/1985 | Ropars et al. | 528/232 |
| 4,543,388 | 9/1985 | Treybig et al. | 524/597 |

FOREIGN PATENT DOCUMENTS 45-1265 1/1970 Japan .
57398 9/1974 Romania .

OTHER PUBLICATIONS

"Effect of 2,5-Dimethylpyrazine on Aldehydes", Berichte der Deutschen Chemischen Gesellschaft, vol. 38, No. 3 (1905) pp. 3724–3728 by R. Franke.
"Poly-2,5-Distyrylpyrazine and Its Properties", Journal of Polymer Science: Part A-1, vol. 7, pp. 2037–2049 (1969) by Fuyishige and Hasegawa.
"Solid State Photopolymerization", Kozyo Gijutsuin Sen'l Kozyo Shikensho Kenkyu Habaku, Yokahawa, Japan, 1969, No. 86, pp. 1–12 by Hasegawa, Masaki.
"Structure and Properties of Poly-2,5-Distyrylpyrazine", J. Polymer Sci., Part A-2, 1970, No. 8, pp. 1027–1037.
"Characterization of Cured Polystyrylpyridine by Model Compounds", Journal of Applied Polymer Science, vol. 26, pp. 1975–1987 (1981) by Hsu, Rosenberg, Parker and Heimbuch.
"Four-Center Type Photopolymerization in Solid State" by Masaki Hasegawa, Polymer Chem., vol. 27, No. 302, pp. 337–349 (1970).
Mustafa and Hilmy, J. Chem. Soc., 1947, pp. 1698–1699.
Shaw, J. Chem. Soc., 1924, pp. 2363–2365.
Shaw and Wagstaff, J. Chem. Soc., 1933, pp. 77–79.
"Four-Center Type Photopolymerization in the Solid State. I. Polymerization of 2,5-Distyrylpyrazine and Related Compounds" by Hasegawa, Suzuki, Suzuki and Nakanishi, J. Polymer Sci., Part A-1, vol. 7, pp. 743–752.
"On α-Styrylpyridine", H. Baurath, Ber., 20, 1887, pp. 2719–2720.
"Condensation of α- and Y-Methylpyridine Derivatives with Cinnamaldehyde", by Späth, Kubiczek and Dubensky, Ber., 74B, pp. 873–879 (1941).
"On the Condensation of α:Y:α′-Trimethylpyridine with Benzaldehyde", by Königs and Bentheim, Ber., 38, pp. 3907–3911 (1905).
A dissertation "Stereochemistry of Styrylpyridine Photodimers" by Stephen Edward Burkle, University of New Hampshire, 1973.
Application entitled "Vinyl Styryl Pyridines and Their Copolymerization with Bismaleimide Resins" filed by NASA (application number and filing date unknown).
"Polymerization of Phenylacetaldehyde" by Dr. Arno Muller, The American Perfumer, Nov. 1936, pp. 50–52.
"Studies on Polyphenylacetylenes Obtained by Polycondensation (II)" by C. Simionescu and S. Vasilin, Acta Chimica Acadamiae Scientiarum Hungaricae, Tomus 74 (4) pp. 461–470 (1972).
"On Some Aldol and Condensation Reactions of Phenylacetaldehyde" by W. Treibs and K. Krumbholz, Chemische Berichte, vol. 85, No. 12, pp. 1116–1119 (1952).
"The Mechanism of Arsenic Pentafluoride Doping of Polyacetylene" by Clarke, Geiss, Gill, Grant, Morawitz, Street and Sayers, Synthetic Metals, 1979, pp. 21–28.
"Stability and Stabilization of Polyacetylene, Polyphenylacetylene, and Acetylene/Phenylacetylene Copolymers" by Deits, Cukor, Rubner and Jopson, Synthetic Metals, 1982, pp. 199–210.

Primary Examiner—Lucille M. Phynes
Attorney, Agent, or Firm—J. G. Carter

[57] ABSTRACT

Thermoplastic or thermosettable products are prepared by reacting a heterocyclic compound containing at least one nitrogen atom and at least two pendant groups containing a reactive hydrogen atom attached to a carbon atom which is attached to the aromatic heterocyclic ring such as 2,4,6-trimethylpyridine or 2,3,5,6-tetramethylpyrazine with an aldehyde having a hydrogen atom attached to a carbon atom adjacent to the carbonyl group such as phenylacetaldehyde. Also, heat resistant thermoplastic or thermosettable products are prepared by reacting the above product with either a hydroxy aromatic monoaldehyde such as 4-hydroxybenzaldehyde, aromatic dialdehyde such as terephthaldicarboxaldehyde or mixture thereof. Many of these products exhibit bulk conductive properties when doped with a dopant (doping agent) such as antimony pentafluoride.

26 Claims, No Drawings

THERMOPLASTIC AND THERMOSETTABLE PRODUCTS PREPARED BY REACTING NITROGEN-CONTAINING HETEROCYCLIC COMPOUNDS WITH AROMATIC ALDEHYDES

BACKGROUND OF THE INVENTION

The present invention pertains to thermoplastic or thermosettable products prepared by reacting an aromatic heterocyclic compound containing at least one nitrogen atom and at least two reactive substituent groups containing a hydrogen atom attached to a carbon atom which is attached to the aromatic heterocyclic ring, an aldehyde having a reactive hydrogen atom attached to a carbon atom which is adjacent to the carbonyl group and optionally, a hydroxy aromatic aldehyde, an aromatic aldehyde or mixture thereof and cured products therefrom.

These polymers have good thermal and physical properties and are useful in the preparation of composites. They exhibit surface resistivity between 10,000 ohm/sq. and 100,000 meg ohms/sq. when suitably mixed or contacted with an agent such as antimony pentafluoride. Materials with volume resistivity between 10,000 ohm/sq. and 100,000 meg ohms/sq. are classified as antistatic or static dissipative materials. Antistatic materials are capable of dissipating 5000 volts in 2 seconds or less.

Antistatic polymers are used for packaging electronics, in material handling equipment, flooring, carpet backing, cabinetry and structural plastics. Antistatic material handling equipment such as conveyors, slide tubes, tote bins, and bench-top work surfaces protect sensitive electronics from triboelectricity. Antistatic flooring is used in areas of electronic assembly where sensitive components are handled and in medical areas such as operating rooms where flammable gases are routinely handled. Antistatic carpets eliminate problem or annoyance of static shock in air conditioned, climate controlled offices, hallways, residences, and other areas. These carpets protect computers and other sensitive electronics in use or storage. Shielded cabinetry for electronics is essential for carrying off charge produced internally by the action of moving parts like disk drives and relays.

Many of the polymers of the present invention after surface or internally doping with antimony pentafluoride of another such dopant (doping agent) are particularly suitable for antistatic material handling equipment, cabinetry and structural polymers. In addition to antistatic properties, the thermosettable products prepared by reacting an aromatic heterocyclic compound containing at least one nitrogen atom and at least two substituent groups containing a hydrogen atom attached to a carbon atom which is attached to the aromatic heterocyclic ring, an aldehyde having a hydrogen atom attached to a carbon atom which is adjacent to the carbonyl group, and an aromatic dialdehyde or their mixture exhibits a char yield of 55.2% in nitrogen at 950° C. Char yield is defined herein as the percent by weight of the polymer remaining after exposure to 950° C. during a thermogravimetric analysis of the polymer in a nitrogen atmosphere.

SUMMARY OF THE INVENTION

One aspect of the present invention pertains to a thermoplastic or thermosettable product which results from reacting a composition comprising
  (A) at least one aromatic heterocyclic material containing at least one nitrogen atom and at least two reactive substituent groups having a reactive hydrogen atom attached to a carbon atom which is attached to the aromatic heterocyclic ring;
  (B) at least one aldehyde having a hydrogen atom attached to a carbon atom which is adjacent to a carbonyl group; and
  (C) optionally at least one material selected from
    (1) hydroxy aromatic aldehydes;
    (2) aromatic dialdehydes; and
    (3) combinations of (1) and (2); and
wherein, when component (C) is absent, components (A) and (B) are present in quantities which provide a molar ratio of component (B) to component (A) of from about 0.5:1 to about 10:1, preferably from about 1:1 to about 6:1, most preferably from about 1.5:1 to about 4:1 and when component (C) is present, the components are present in a molar ratio of components (B) to (C) to (A) of from about 0.25:0:1 to about 10:2:1, preferably from about 1:0.25:1 to about 5:1:1, most preferably from about 1:0.5:1 to about 3:1:1.

Another aspect of the present invention pertains to the products resulting from curing the aforementioned thermosettable reaction products.

A further aspect of the present invention pertains to the product resulting from mixing or treating the aforementioned thermoplastic or thermosettable products or the resultant cured, thermoset, thermosettable products with a dopant (doping agent) so as to reduce the surface resistivity of the product to less than 100,000 megohm/sq.

DETAILED DESCRIPTION OF THE INVENTION

The thermoplastic and thermosettable products of the present invention are prepared by reacting an aromatic heterocyclic material containing at least one nitrogen atom and at least two reactive substituent groups having a reactive hydrogen atom attached to a carbon atom which is attached to the aromatic heterocyclic ring with at least one monoaldehyde or dialdehyde having a reactive hydrogen atom attached to a carbon atom which is adjacent to the carbonyl group or groups and optionally with at least one material selected from hydroxy aromatic aldehydes, aromatic dialdehydes and combinations thereof. The reaction can be conducted at temperatures of from about 100° C. to about 350° C., preferably from about 150° C. to about 300° C. until the reaction is essentially complete, usually from about 8 hours to about 70 hours depending upon the temperature employed.

Thermoplastic products are prepared by reaction of an alkyl substituted aromatic heterocyclic material with at least one monoaldehyde having a hydrogen atom attached to a carbon atom which is adjacent to a carbonyl group or the reaction of a mixture of the alkyl substituted aromatic heterocyclic material, at least one aldehyde having a hydrogen atom attached to a carbon atom which is adjacent to a carbonyl group and either a hydroxy aromatic aldehyde, aromatic dialdehyde or their combination.

A thermosettable prepolymer or polymer is prepared by the reaction of a hydroxy aromatic aldehyde, aromatic dialdehyde or their combination with the product formed after 1 to 48 hours from the reaction of an alkyl substituted aromatic heterocyclic material with at least one monoaldehyde or dialdehyde having a hydrogen atom attached to a carbon atom which is adjacent to the carbonyl group or groups. A thermosettable prepolymer or polymer is prepared by the reaction of a hydroxy aromatic aldehyde, aromatic dialdehyde or their combination and alkyl substituted aromatic heterocyclic material with the product formed after 1 to 48 hours from the reaction of a monoaldehyde or dialdehyde having a hydrogen atom attached to a carbon atom which is adjacent to the carbonyl group or groups with itself. A thermosettable prepolymer or polymer is also prepared by the reaction of an alkyl substituted aromatic heterocyclic material with a dialdehyde having a hydrogen atom attached to a carbon atom which is adjacent to the carbonyl groups or by the reaction of an alkyl substituted aromatic heterocyclic material with the product formed after 1 to 48 hours from the reaction of a dialdehyde having a hydrogen atom attached to a carbon atom which is adjacent to the carbonyl groups with itself.

The reaction can be conducted in the absence or presence of suitable catalysts such as, for example, acids, Lewis acids, bases or salts. Particularly suitable acids include, for example, sulfuric, hydrochloric or p-toluene-sulfonic acid. Particularly suitable bases include, for example, hydroxides of alkali or alkaline earth metals or of quaternary ammonium. Particularly suitable Lewis acids include, for example, boron trifluoride, aluminum trichloride and the like. Particularly suitable salts include, for example, zinc chloride, stannic chloride, antimony pentachloride, antimony pentafluoride, ferric chloride, titanium tetrachloride, mercuric dichloride, stannous chloride, cobalt dichloride, nickel dichloride, magnesium dichloride, cadmium dichloride and the like. The use of such catalysts is not indispensable but it reduces the time required for the reaction. The amount is e.g. of from about 0.1 to about 10 mole% with respect to the aromatic aldehyde. If desirable, larger or lesser quantities can be employed.

The reaction can also be accelerated by certain substances such as methyl iodide, methyl sulfate, benzyl chloride etc., capable of forming with the pyridinic and/or pyrazinic base quaternary ammonium derivatives, such substances being usable in catalytic amounts or higher proportions.

Dehydrating agents such as acetic anhydride, trifluoroacetic anhydride, propionic anhydride and the like can promote the reactions and its action can be sufficient to render superfluous the incorporation of a catalyst. The amount of anhydride used ranges from 1 to 10, preferably 1.1 to 5 moles per mole of aldehyde. The preferred dehydrating medium is a mixture of glacial acetic acid and acetic anhydride. The acetic acid and acetic anhydride can be removed by distillation, solvent extraction, solvent fractionation or by neutralization with a base. Examples of several solvent fractionation methods are described in U.S. Pat. Nos. 4,362,860 and 4,471,107 which are incorporated herein by reference. Suitable bases include sodium hydroxide, ammonium hydroxide and ammonia.

The reaction is usually conducted either under reduced pressure or in an inert atmosphere such as, for example, nitrogen, helium, neon, xenon, argon, mixtures thereof and the like.

Suitable aldehydes having a hydrogen atom attached to a carbon atom which is adjacent to a carbonyl group which can be employed herein include those represented by the formulas

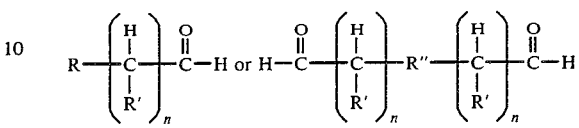

wherein R is a monovalent hydrocarbyl group having from 1 to about 20, preferably from about 6 to about 12, carbon atoms; each R' is independently hydrogen or a hydrocarbyl group having from about 1 to about 4, carbon atoms, preferably hydrogen, R'' is a divalent hydrocarbyl group having from about 6 to about 12, preferably 6 carbon atoms and each n independently has a value from 1 to about 10, preferably from 1 to about 4. The hydrocarbyl groups can be substituted with halogen atoms if desired.

The term hydrocarbyl as employed herein means any aliphatic, cycloaliphatic, aromatic, aryl substituted aliphatic or aliphatic substituted aromatic groups. The preferred hydrocarbyl groups are aromatic and aliphatic substituted aromatic groups. The preferred aromatic group is benzene.

Particularly suitable aldehydes which can be employed herein include, for example, phenylacetaldehyde (benzeneacetaldehyde), p-methylbenzeneacetaldehyde (syringaldehyde), α-methylbenzeneacetaldehyde, 4-hydroxybenzeneacetaldehyde, benzenepropanal, 1,4-benzenediacetaldehyde, 1,4-benzenedipropanal, mixtures thereof and the like.

Suitable heterocyclic materials having one or more nitrogen atoms in the ring and at least two reactive substituent groups having a reactive hydrogen atom attached to a carbon atom attached to an aromatic heterocyclic ring which can be employed herein include, for example, pyridines, pyrazines, pyrimidines, purines, pteridines, imidazoles, triazines, quinolines, quinoxalines, combinations thereof and the like.

In order for the hydrogen atom of the substituent group which hydrogen atom is attached to a carbon atom attached to an aromatic heterocyclic ring to be reactive, the substituent group must be either ortho or para with respect to a nitrogen atom. In the instance of substituted pyrazines, all of the substituent groups attached to an aromatic heterocyclic ring carbon atom are ortho with respect to a nitrogen atom.

Particularly suitable pyridines which can be employed herein include, for example, 2,6-dimethylpyridine, 2,4-dimethylpyridine, 2,4,6-trimethylpyridine(2,4,6-collidine), 2,3,4-trimethylpyridine, 2,3,6-trimethylpyridine, 2,4,5-trimethylpyridine, 2-ethyl-3,6-dimethylpyridine, 4-ethyl-2,6-dimethylpyridine, 2,6-diethylpyridine, 2,3-dimethyl-6-(1-methylethyl)pyridine, 3,6-dimethyl-2-(1-methylethyl)pyridine, 2-methyl-6-propylpyridine, 2,5-dimethyl-6-propylpyridine, 3-ethyl-2,5,6-trimethylpyridine, 2,3,4,5-tetramethylpyridine, 2,3,4,6-tetramethylpyridine, 2,3,5,6-tetramethylpyridine, pentamethylpyridine, 2,6-dimethyl-3-pyridinamine, 3-chloro-2,6-dimethylpyridine, mixtures thereof and the like. Pyridines having only one substituent group having a reactive hydrogen atom attached to a carbon atom which is attached to the aromatic heterocyclic ring, such as, for example, 2-methylpyridine, 4-methylpyridine, 2-ethylpyridine, 2-propylpyridine and the like can be mixed or blended with the heterocyclic pyridine materials having 2 or more of the enumerated substituent groups to control the molecular weight of the thermosettable product.

Suitable pyrazines which can be employed herein include any pyrazine which has at least two substituent groups which have at least one hydrogen atom attached to a carbon atom which is attached to the aromatic heterocyclic ring. Particularly suitable pyrazines include, di-, tri- and tetraalkyl pyrazines such as, for example, 2,5-dimethylpyrazine, 2,6-dimethylpyrazine, 2,3,5-trimethylpyrazine, 2,3,5,6-tetramethylpyrazine, 2,5-dimethyl-3,6-pyrazinediamine, 2,3,5-trimethyl-6-nitropyrazine, 5-ethyl-2,6-dimethylpyrazine, 2,5-dimethyl-3-propylpyrazine, 3-chloro-2,5,6-trimethyl-pyrazine, 3-chloro-2,5-dimethylpyrazine, 2-ethyl-5-methylpyrazine, 2,5-diethylpyrazine, 2-ethyl-3,5-dimethylpyrazine, 2-ethyl-3,6-dimethylpyrazine, 5-methyl-2-propylpyrazine, 3,5-dimethyl-2-propylpyrazine, 2-butyl-3,5-dimethylpyrazine, 2-butyl-3,6-dimethylpyrazine, 2-butyl-5-ethylpyrazine, 2,5-dimethyl-3,6-bis(2-methylpropyl)pyrazine, 2,6-diethyl-3,5-dimethylpyrazine, 2,5-diethyl-3,6-dimethylpyrazine, 2,5-dimethyl-3,6-bis(1-methylethyl)pyrazine, and 2,3,5-trimethyl-6-(2-methylpropyl)pyrazine, mixtures thereof and the like. Pyrazines having only one substituent group having a reactive hydrogen atom attached to a carbon atom which is attached to the aromatic heterocyclic ring, such as, for example, 2-methylpyrazine can be mixed or blended with pyrazine having two or more of the aforesaid substituent groups to control the molecular weight of the prepolymer.

Other aromatic nitrogen containing heterocycles such as pyrazole, pyridazine, pyrimidines, purines, pteridines, imidazoles, triazines, quinolines and quinoxalines having two or more substituents which have at least one reactive hydrogen atom attached to a carbon atom which is attached to the aromatic heterocyclic ring can be employed herein. Suitable pyrazoles include 3,5-dimethylpyrazole, 1-ethyl-3,5-dimethylpyrazole and 3,4,5-trimethylpyrazole. Suitable pyridazines include 3,5-dimethylpyridazine, 4-chloro-3,5-dimethylpyridazine and 3,4,5-trimethylpyridazine. Suitable pyrimidines include 2,4-dimethylpyrimidine, 4,6-dimethylpyrimidine, 2,6-dimethyl-4-pyrimidinamine and 2,4,6-trimethylpyrimidine. Suitable purines include 2,8-dimethylpurine, 2,8-dimethyl-6-purinamine, and 2,6,8-trimethylpurine. Suitable pteridines include 6,7-dimethylpteridine, 2,6-dimethylpteridine, 2,4,7-trimethylpteridine, and 2,4,6,7-tetramethylpteridine. Suitable imidazoles include 2,5-dimethylimidazole, 2,4-dimethylimidazole and 2,4,5-trimethylimidazole. Suitable triazines include 3,5-dimethyl-1,2,4-triazine, 3,6-dimethyl-1,2,4-triazine, 2,6-dimethyl-1,3,5-triazine and 2,4,6-trimethyl-1,3,5-triazine. Suitable quinolines include 2,4-dimethylquinoline, 2,4,6-trimethylquinoline and 2,4,6,7-tetramethylquinoline. Suitable quinoxalines include 2,3-dimethylquinoxaline, 2,3,7-trimethylquinoxaline and 2,3,6,8-tetramethylquinoxaline. Pyrazoles, pyridazines, pyrimidines, purines, pteridines, imidazoles, triazines, quinolines and quinoxalines having two or more of such substituents can be mixed or blended with each other, pyridines and/or pyrazines having two or more of such substituents.

Molecular weight control of the polymer can be obtained by the addition of, as a chain terminator, an aromatic nitrogen containing heterocycle having one substituent which has at least one reactive hydrogen atom attached to a carbon atom which is attached to the aromatic heterocyclic ring to an aromatic nitrogen containing heterocycle having two or more substituents which have at least one reactive hydrogen atom attached to a carbon atom which is attached to the aromatic heterocyclic ring. For example, pyrazines, pyridines, pyrazoles, pyridazines, pyrimidines, purines, pteridines, imidazoles, triazines, quinolines, or quinoxalines or a mixture of any two or more such compounds having at least one such substituent can be blended or mixed with those having more than one such substituent.

Suitable aldehydes which can be employed herein in addition to the aforementioned aldehydes include any aromatic aldehyde which contains (a) at least one hydroxy substituent group, (b) at least one aldehyde group and no other substituent groups which would tend to interfere with the reaction of the aldehyde groups and (c) a hydrogen on an aromatic carbon ortho with respect to the hydroxy group and the said substituent groups of the aromatic nitrogen containing heterocyclic material. Particularly suitable aldehyde materials include for example, 2-hydroxybenzaldehyde, 3-hydroxybenzaldehyde and 4-hydroxybenzaldehyde.

Suitable aromatic dialdehydes which can be employed herein in addition to the aforementioned aldehydes include any aldehydes which contain at least two aldehyde groups and no other substituent groups which would tend to interfere with the reaction of the aldehyde groups and the said substituent groups of the nitrogen containing aromatic heterocyclic material. Particularly suitable aldehyde materials include, for example, those of the formula:

wherein n=2 or more, and R is an aromatic group such as, for example,

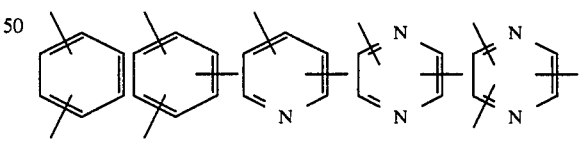

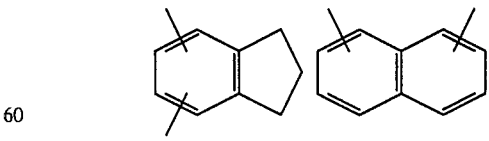

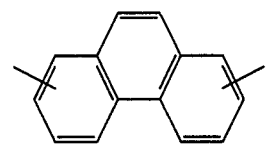

-continued

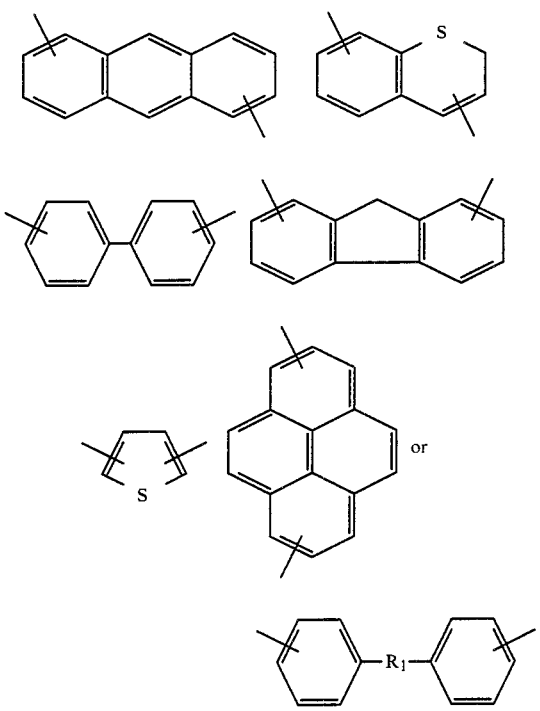

where R₁ is alkylene, oxygen, sulfur, oxyalkylene, polyoxyalkylene,

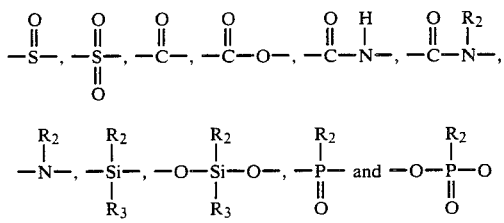

wherein R₂ and R₃ are alkyl, aryl or aralkyl, and substituted groups thereof.

Particularly suitable aldehydes include, for example, terephthaldicarboxaldehyde, o-phthalicdicarboxaldehyde, isophthalaldehyde, glyoxal, dicinnamylaldehyde, 2,5-pyrazinedicarboxaldehyde, 2,3,4,5-pyrazinetetracarboxaldehyde, 1,5-naphthalenedicarboxaldehyde, 1,2,4,5,7,8-naphthalenehexacarboxaldehyde, 1-bromo-2,5-naphthalenedicarboxaldehyde, 2-hydroxy-1,5-naphthalenedicarboxaldehyde, 2,6-phenanthrenedicarboxaldehyde, 2,7-pyrenedicarboxaldehyde, 4-chloro-2H-thiochromene-3,7-dicarboxaldehyde, 2,6-fluorenedicarboxaldehyde, 10-chloro-3,8-anthracenedicarboxaldehyde, 3,7-quinolinedicarboxaldehyde, 4,4'-bisbenzene-1-carboxaldehyde, 4,4'-oxy-bisbenzene-1-carboxaldehyde, 4,4'-(2,1-ethanediylbisoxy)-benzene-1-carboxaldehyde, 4,4'-sulfonylbisbenzene-1-carboxaldehyde, 4,4'-methylenebisbenzene-1-carboxaldehyde, and mixtures thereof.

Monoaldehydes such as benzaldehyde, o-tolualdehyde, trans-cinnamaldehyde, 3-chlorobenzaldehyde or p-anisaldehyde can be employed to control the molecular weight of the prepolymer.

Volatile emissions during cure can be limited by subjecting the thermosettable prepolymers, thermoplastics or resins of the present invention to sublimation, distillation or solvent extraction to remove reactants, catalyst and solvents. Suitable solvents for extraction include, for example, hydrocarbons, ketones, alcohols, ethers, chlorinated solvents and the like. Particularly suitable solvents include hexane, acetone, methanol, ethanol, tetrahydrofuran, water, mixtures thereof and the like.

The thermosettable prepolymers or resins of the present invention can be cured as is or after impregnation with conductive carbon black with the application of heat and pressure, or they can be dissolved in a suitable solvent or mixture of solvents and employed to saturate various reinforcing materials so as to prepare composites therefrom through the application of heat and pressure. Also, composites can be prepared by dissolving the thermoplastic materials of the present invention in a suitable solvent or mixture of solvents and saturating various reinforcing materials. Conductive carbon black can be incorporated into the thermoplastic materials.

Suitable solvents which can be employed for preparing these composites include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidinone, dimethylformamide, dimethylacetamide, nitrobenzene, mixtures thereof and the like.

Suitable reinforcing materials include, for example, glass fibers, aramid fibers, carbon or graphite fibers and the like in any form such as, for example, matt, woven or fibrous form. Any synthetic or natural fiber materials can be employed as the reinforcing material. Also, antistatic or conductive fiber materials can be employed as the reinforcing materials.

The thermosettable products can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, molded articles, films, coatings and the like.

The thermosettable products are advantageously set by a thermal treatment at a temperature of from about 100° to about 300° C. When the thermosettable products contain reinforcing agents, it is desirable to cure the thermosettable products under both heat and pressure, e.g. up to about 100,000 psig (689 MPa). Finally there is obtained a non-fusible and non-soluble polymer. Said polymer has a good thermal stability.

Suitable dopants which can be employed herein to lower the volume resistivity of the products include, for example, antimony pentafluoride, arsenic pentafluoride, Lewis acids, halogens or alkali metals (liquid, solvents and/or vapors), combinations thereof and the like.

Suitable Lewis acids include HCl, HI, HF, HBr, $H_2SO_4$ and $F_3C(SO_2)OH$. Suitable halogens include $Br_2$ and $Cl_2$. Suitable alkali metals include sodium or potassium. The amounts, times of treatment and temperature of treatment can be varied depending on whether only surface treatment is desired, a short time; or depth penetration is desired, a long time; or a short time high temperature, up to 250° C. These and other dopants are disclosed in U.S. Pat. No. 4,489,913 which is incorporated herein by reference.

The following examples are illustrative of the present invention, but are not to be construed as to limiting the scope thereof in any manner.

EXAMPLE 1

In a 500 ml glass reaction vessel equipped with a means for stirring, temperature control, nitrogen purging and a molecular sieve trap to remove water formed during the reaction was added 109 g (0.8 mole) of 2,3,5,6-tetramethylpyrazine and 192.2 g (1.6 moles) of phenylacetaldehyde. After the reaction temperature reached 140° C., 4.09 g (0.0417 mole) of concentrated sulfuric acid was added. The reaction temperature was maintained between 128° C. and 190° C. for four hours (14,400 s). After this time, phenylacetaldehyde dimer which results from the self condensation of phenylacetaldehyde and the condensation product of one molecule of 2,3,5,6-tetramethylpyrazine with phenylacetaldehyde were identified as constituents of the reaction product by electron impact capillary chromatography mass spectroscopy (EI-CCMS). After the reaction temperature had been maintained between 128° C. and 215° C. for a total of 23 hours and 40 minutes (85,200 s), an additional 4.13 g (0.042 mole) of concentrated sulfuric acid was added. The reaction temperature was then maintained at a temperature between 128° C. and 225° C. for an additional 6 hours (21,600 s). On cooling to room temperature (25° C.), the reactor contents was a shiny black and brittle solid. This black solid was crushed with a mortar and pestle to give a brown powder which was soluble in acetone and tetrahydrofuran but insoluble in water and methanol. The powder was stirred in water for two hours (7200 s) and then the water was removed by vacuum filtration. The powder was washed with water, then methanol and again with water. The powder was then dried at 180° C. for 43 hours and 18 minutes (155,880 s). Condensation products with molecular weights of 324, 426, 442 and 544 were identified in a methane chemical ionization probe mass spectroscopy analysis of the powder. Gel permeation chromatography based upon polystyrene standards indicated that the number and weight average molecular weight of the brown polymer were 1037 and 1183, respectively. The brown powder exhibited a distinct melting point between 152° C. and 162° C.

The brown powder in an aluminum pan was placed in an oven under full vacuum at 180° C. After the powder melted, the aluminum pan and contents were removed from the oven and allowed to cool to room temperature (25° C.) giving a black shiny thermoplastic.

EXAMPLE 2

To a 500 ml glass reaction vessel equipped with an immersion thermometer, mechanical stirrer, condenser, Barrett trap and nitrogen purge system were added 242.4 g (2 moles) of 2,4,6-collidine and 120.1 g (1 mole) of phenylacetaldehyde. The contents were heated with stirring and when the temperature reached 139° C., 3.5 g (0.0257 mole) of zinc chloride was added. The reactants were maintained at a temperature between 127° C. and 183° C. for 18 hours and 16 minutes (65,760 s) before water and collidine were removed from the Barrett trap. Water and collidine were identified in the Barrett trap by EI-CCMS. Phenylacetaldehyde dimer, the condensation product of one molecule of 2,4,6-collidine with one molecule of phenylacetaldehyde and the condensation product of 2,4,6-collidine with phenylacetaldehyde dimer were identified as constituents of the reaction product by EI-CCMS. The reactor contents were then heated between 183° C. and 202° C. for an additional 22 hours and 45 minutes (81,900 s) while water and collidine were continuously removed from the Barrett trap. On cooling to room temperature (25° C.), the reactor content was a very viscous black liquid. The viscous black liquid was cooled with dry ice to yield a solid. The black solid was crushed with a mortar and pestle to give a brown powder. The powder was stirred in water for thirty minutes (1800 s) and then the water was removed by vacuum filtration. The powder was dried in a vacuum (1 mm Hg) oven for 15 hours (54,000 s) at 180° C. While drying, the brown powder melted. A black shiny solid or thermoplastic was obtained on cooling to room temperature (25° C.).

EXAMPLE 3

To a reaction vessel as described in Example 2 was added 91.3 g (0.75 mole) of 2,4,6-collidine and 180.9 g (1.5 moles) of phenylacetaldehyde. After the temperature reached 121° C., 5.24 g (0.0385 mole) of zinc chloride was added. The temperature was maintained between 190° C. and 218° C. for 27 hours and 17 minutes (98,220 s). A mixture (14.5 g) of water and 2,4,6-collidine were removed from the Barrett trap. Phenylacetaldehyde dimer and the condensation product of 2,4,6-collidine with phenylacetaldehyde were identified as constituents of the reaction product by EI-CCMS. The reactor contents were heated between 217° C. and 300° C. for an additional 42 hours and 46 minutes (153,960 s). On cooling to room temperature (25° C.), the reaction product was a black shiny solid. Gel permeation chromatography indicated the number and weight average molecular weights of the black polymer to be 789 and 974, respectively. Gel permeation chromatography also showed the majority of the molecular weight of the polymer was obtained on reacting 2,4,6-collidine with phenylacetaldehyde between 190° C. and 218° C. for only 27 hours (97,200 s).

The infrared spectra of the black shiny solid showed a small carbonyl band at 1700 cm$^{-1}$, a very small band at 956 cm$^{-1}$ due to trans unsaturation, bands between 3020–3080 cm$^{-1}$, 3020–3080 cm$^{-1}$, at 700 cm$^{-1}$ and 760 cm$^{-1}$ attributed to the presence of a monosubstituted benzene nucleus and two bands at 1160 cm$^{-1}$ and 1180 cm$^{-1}$ which are characteristic of the deformation vibrations in the plane of the trans-alcene C-H link. The black solid was ground to a powder with a mortar and pestle, washed with hexane and dried in air. The powder in an aluminum pan was placed in an oven under full vacuum at 180° C. After the powder melted, the aluminum pan and contents were removed from the oven and allowed to cool to room temperature (25° C.) giving a black-shiny thermoplastic. This thermoplastic exhibited a surface resistivity of $3 \times 10^{10}$ ohms/cm$^2$. After the surface of the black thermoplastic was treated (doped) with antimony pentafluoride, the surface resistivity was $6 \times 10^7$ ohms/cm$^2$.

EXAMPLE 4

To a reaction vessel as described in Example 1 was added 137.2 grams (1.01 moles) of 2,3,5,6-tetramethylpyrazine and 180.5 grams (1.5 moles) of phenylacetaldehyde. After the reaction temperature reached 153° C., 7 g (0.051 mole) of zinc chloride was added. The temperature was maintained between 144°–167° C. for 3 hours and 19 minutes (11,940 s). After the reactor contents were cooled to 100° C., 67.1 g (0.5 mole) of terephthaldicarboxaldehyde and 1.77 grams (0.013 mole) of zinc chloride were added to the dark brown colored reactor contents. Then the temperature was maintained between 144°-223° C. for 9 hours and 25 minutes where the reddish brown reactor contents reached maximum viscosity. The reactor contents were a dark red brown shiny and hard solid after cooling to room temperature (25° C.). This red brown solid was crushed with a mortar and pestle to give a reddish brown powder that melted between 101°-160° C. the reddish brown prepolymer was only partially soluble in methanol, acetone and tetrahydrofuran.

EXAMPLE 5

The reddish brown prepolymer (153.6 grams) described in Example 4 was stirred in methanol (455.2 grams) for 1 hour 29 minutes (5340 s). Then the methanol was removed by filtration. The prepolymer was washed with methanol, twice with hexane, hexane filtrate, a mixture of 25% acetone and 75% methanol, hexane filtrate, and a mixture of 25% acetone and 75% methanol. The prepolymer was dried in an oven under full vacuum between 115°-200° C. for 4 hours 23 minutes (15,780 s). The dried prepolymer was pulverized with a mortar and pestle and then sieved with a U.S.A. Standard Testing Sieve No. 40 to give a fine dark brown powder. The dark brown powder softened at 268° C. The dark brown prepolymer (26 grams) was compression molded between 247°-301° C. and 6750-7200 psi (46,541-49,644 kPa) for 3 hours 3 minutes (10,980 s) with a Carver Laboratory press, employing a silicone mold release agent. Dynamic mechanical analyses were performed between −160° to 400° C. in the torsional rectangular mode with an oscillatory frequency of 1 hertz and 0.05% strain. The black thermoset polymer exhibited a gamma transition ($T_\gamma$) temperature at −98° C. and storage modulus (G') of $1.18 \times 10^{10}$ dynes/cm$^2$ at 25° C. Originally, the polymer exhibited a surface resistivity of $3 \times 10^{10}$ ohms/cm$^2$. After the surface of the black thermoset polymer was doped with antimony pentafluoride, the surface resistivity was $3 \times 10^7$ ohms/cm$^2$.

EXAMPLE 6

The reddish brown prepolymer (110.2 grams) described in Example 4 was stirred in methanol (381.5 grams) for 1 hour 24 minutes (5040 s). The methanol was removed by filtration. The prepolymer was washed with methanol, acetone and then methanol. The prepolymer was dried in an oven under full vacuum between 60°-130° C. for 23 hours 49 minutes. The dried prepolymer was pulverized with a mortar and pestle and then sieved with a U.S.A. Standard Testing Sieve No. 40 to give a fine golden brown powder that melted between 180°-220° C. The infrared spectra of the powder showed a small carbonyl band at 1700 cm$^{-1}$, a large band at 965 cm$^{-1}$ due to trans unsaturation, bands between 3020-3080 cm$^{-1}$, at 1400, 1590, 700 and 750 cm$^{-1}$ attributed to the presence of a monosubstituted benzene nucleus and two bands at 1155 and 1180 cm$^{-1}$ which are characteristic of the deformation vibrations in the plane of the trans-alcene C-H link. The golden brown sieved prepolymer (26 grams) was compression molded between 233°-292° C. and 7400-8000 psi (51,023-55,160 kPa) for 2 hours 56 minutes (10,560 s) with a Carver Laboratory press as described in Example 5. The black, thermosetted polymer was post cured at 248° C. for 15 hours 10 minutes (54,600 s). Thermogravimetric analysis in nitrogen showed 5% weight loss at 427° C. and 44.8% weight loss at 950° C. In air, the post cured polymer lost 5% weight at 425° C.

EXAMPLE 7

The reddish brown prepolymer (153.6 grams) described in Example 4 was stirred in methanol (455.2 grams) for 1 hour 29 minutes (5340 s). Then the methanol was removed by filtration. The prepolymer was washed with methanol, twice with hexane, hexane filtrate, a mixture of 25% acetone and 75% methanol, hexane filtrate and a mixture of 25% acetone and 75% methanol. The prepolymer was dried in an oven under full vacuum between 115°-200° C. for 2 hours 49 minutes (10,140 s). The dried prepolymer was crushed with a mortar and pestle and then sieved with a U.S.A. Standard Testing Sieve No. 40 to give a fine orange brown powder that melted between 190°-195° C. The sieved orange brown prepolymer (53 grams) was dissolved in N-methylpyrrolidinone (144.8 grams) by heating to a slight boil on a hot plate. The N-methylpyrrolidinone solution of the prepolymer was brushed onto a 14"×14" (35.6 cm×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 117°-172° C. for 32 minutes (1920 s). The reddish brown prepolymer scraped off the graphite fiber mat preimpregnate softened between 175°-187° C. Nine 4"×4" (10.1×10.1 cm) sections were cut from the graphite fiber mat preimpregnate, layed up on top of one another and then compression molded between 182°-273° C. and 2120-2200 psi (14,617-15,169 kPa) for 3 hours (10,800 s) with a Carver Laboratory press as described in Example 5. The finished composite had thoroughly fused giving a black, rigid sample after trimming. Thermogravimetric analysis of the graphite composite in nitrogen showed 5% weight loss at 468° C. and 22.2% weight loss at 950° C. The composite lost 5% weight at 356° C. in air. Dynamic mechanical analyses showed a gamma transition ($T_\gamma$) temperature at −101° C. and storage modulus (G') of $6.28 \times 10^{10}$ dynes/cm$^2$ at 25° C.

EXAMPLE 8

To a reaction vessel as described in Example 2 was added 121.84 grams (1 mole) of 2,4,6-collidine, 181.19 grams (1.51 moles) of phenylacetaldehyde, 67.02 grams (0.5 mole) of terephthaldicarboxaldehyde and 7.08 grams (0.052 mole) of zinc chloride. The contents were heated with stirring to 154° C. The temperature was maintained between 148°-230° C. for 19 hours 40 minutes (69,840 s). A total of 53.11 grams of a two phase liquid were removed with the Barrett trap. On cooling to room temperature (25° C.), the reaction product was a black shiny hard solid. The black solid was ground to a yellow green powder with a mortar and pestle. The powder was soluble in tetrahydrofuran and partially soluble in methanol and acetone. The yellow green prepolymer (145.24 grams) was stirred in methanol (439.47 grams) for 2 hours 2 minutes (7320 s). Then the methanol was removed by filtration. The prepolymer was washed with methanol, acetone and methanol. The prepolymer was dried in an oven under full vacuum between 110°-160° C. for 2 hours (7200 s). The dried prepolymer was ground with a mortar and pestle and then sieved with a U.S.A. Standard Testing Sieve No. 40 to give a gray-green powder. The infrared spectra of the gray-green powder resembled the infrared spectra of the golden brown powder in Example 6 except the band at 965 cm$^{-1}$ due to trans unsaturation was less intense. The powder melted at 180° C. The gray-green prepolymer was cast in an aluminum pan by heating under full vacuum to 250° C. and cooling to room temperature (25° C.) to give a black thermoplastic. This thermoplastic exhibited a surface resistivity of $3 \times 10^{10}$ ohms/cm$^2$. The surface resistivity was not altered by doping the surface of the thermoplastic with antimony pentafluoride. This result is due to the presence of terephthaldicarboxaldehyde at the beginning of the reaction along with 2,4,6-collidine and phenylacetaldehyde.

I claim:

1. A thermoplastic or thermosettable product which results from reacting a composition comprising
   (A) at least one aromatic heterocyclic material containing at least one nitrogen atom and at least two reactive substituent groups having a reactive hydrogen atom attached to a carbon atom which is attached to the aromatic heterocyclic ring;
   (B) at least one aldehyde having a hydrogen atom attached to a carbon atom which is adjacent to a carbonyl group; and
   (C) optionally at least one material selected from
      (1) hydroxy aromatic aldehydes;
      (2) aromatic dialdehydes; and
      (3) combinations of (1) and (2); and
   wherein, when component (C) is absent, components (A) and (B) are present in quantities which provide a molar ratio of component (B) to component (A) of from about 0.5:1 to about 10:1 and when component (C) is present, the components are present in a molar ratio of components (B) to (C) to (A) of from about 0.25:0:1 to about 10:2:1.

2. A thermoplastic or thermosettable product of claim 1 wherein, when component (C) is absent, components (A) and (B) are present in quantities which provide a molar ratio of component (B) to component (A) of from about 1:1 to about 6:1 and when component (C) is present, the components are present in a molar ratio of components (B) to (C) to (A) of from about 1:0.25:1 to about 5:1:1.

3. A thermoplastic or thermosettable product of claim 2 wherein, when component (C) is absent, components (A) and (B) are present in quantities which provide a molar ratio of component (B) to component (A) of from about 1.5:1 to about 4:1 and when component (C) is present, the components are present in a molar ratio of components (B) to (C) to (A) of from about 1:0.5:1 to about 3:1:1.

4. A thermoplastic or thermosettable product of claim 1 wherein
   (i) component (A) is a pyridine or a pyrazine or combination thereof; and
   (ii) component (B) is represented by the formulas

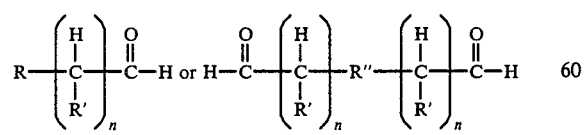

wherein R is a monovalent hydrocarbyl group or halogen substituted hydrocarbyl group having from 1 to about 20 carbon atoms, each R' is independently hydrogen or a hydrocarbyl group having from 1 to about 4 carbon atoms, R" is a divalent hydrocarbyl group or a halogen substituted hydrocarbyl group having 2 to about 12 carbon atoms and each n independently has a value from 1 to about 10.

5. A thermoplastic or thermosettable product of claim 4 wherein
   (i) component (A) is 2,4,6-trimethylpyridine or 2,3,5,6-tetramethylpyrazine or a combination thereof;
   (ii) component (B) is phenylacetaldehyde, p-methylbenzeneacetaldehyde or 1,4-benzenediacetaldehyde or a combination thereof; and
   (iii) component (C), when present, is 4-hydroxybenzaldehyde, 2-hydroxybenzaldehyde or terephthaldicarboxyaldehyde or a combination thereof.

6. A thermosettable product of claim 2 wherein
   (i) component (A) is a pyridine or a pyrazine or combination thereof; and
   (ii) component (B) is represented by the formulas

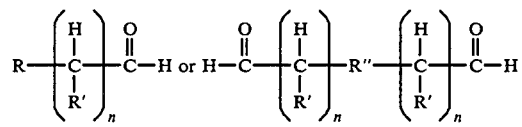

wherein R is a monovalent hydrocarbyl group or halogen substituted hydrocarbyl group having from 6 to about 12 carbon atoms, each R' is independently hydrogen, R" is a divalent aromatic hydrocarbyl group having from 6 to about 12 carbon atoms and each n independently has a value from 1 to about 4.

7. A thermoplastic or thermosettable product of claim 6 wherein
   (i) component (A) is 2,4,6-trimethylpyridine or 2,3,5,6-tetramethylpyrazine or a combination thereof;
   (ii) component (B) is phenylacetaldehyde, p-methylbenzeneacetaldehyde or 1,4-benzenediacetaldehyde or a combination thereof; and
   (iii) component (C), when present, is 4-hydroxybenzaldehyde, 2-hydroxybenzaldehyde or terephthaldicarboxaldehyde or a combination thereof.

8. A thermoplastic or thermosettable product of claim 3 wherein
   (i) component (A) is a pyridine or a pyrazine or combination thereof; and
   (ii) component (B) is represented by the formula

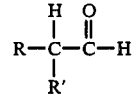

wherein R is a monovalent aromatic hydrocarbyl group having from 6 to about 12 carbon atoms and R' is hydrogen.

9. A thermoplastic or thermosettable product of claim 8 wherein
   (i) component (A) is 2,4,6-trimethylpyridine or 2,3,5,6-tetramethylpyrazine or a combination thereof;
   (ii) component (B) is phenylacetaldehyde; and
   (iii) component (C), when present, is terephthaldicarboxaldehyde.

10. A product resulting from subjecting a thermosettable product of claims 1, 2, 3, 4, 5, 6, 7, 8 or 9 to conditions sufficient to effect curing to a thermoset product.

11. A product of claim 10 which contains a reinforcing material.

12. A product of claim 10 wherein said curing is effected by compression molding at a temperature of from about 150° C. to about 350° C. and a pressure up to about 100,000 psig.

13. A product of claim 11 wherein said curing is effected by compression molding at a temperature of from about 150° C. to about 350° C. and a pressure up to about 100,000 psig.

14. A product of claims 1, 2, 3, 4, 5, 6, 7, 8 or 9 which contains a reinforcing material.

15. A product resulting from mixing or surface treating a product of claims 1, 2, 3, 4, 5, 6, 7, 8 or 9 with a sufficient amount of a dopant (doping agent) so as to reduce the surface resistivity of the product to a value lower than about 100,000 megohm/cm$^2$.

16. A product of claim 15 wherein said doping agent is antimony pentafluoride.

17. A product resulting from mixing or surface treating a product of claim 10 with a sufficient amount of a doping agent so as to reduce the surface resistivity of the product to a value lower than about 100,000 megohm/cm$^2$.

18. A product of claim 17 wherein said doping agent is antimony pentafluoride.

19. A product resulting from mixing or surface treating a product of claim 11 with a sufficient amount of a doping agent so as to reduce the surface resistivity of the product to a value lower than about 100,000 megohm/cm$^2$.

20. A product of claim 19 wherein said doping agent is antimony pentafluoride.

21. A product resulting from mixing or surface treating a product of claim 12 with a sufficient amount of a doping agent so as to reduce the surface resistivity of the product to a value lower than about 100,000 megohm/cm$^2$.

22. A product of claim 21 wherein said doping agent is antimony pentafluoride.

23. A product resulting from mixing or surface treating a product of claim 13 with a sufficient amount of a doping agent so as to reduce the surface resistivity of the product to a value lower than about 100,000 megohm/cm$^2$.

24. A product of claim 23 wherein said doping agent is antimony pentafluoride.

25. A product resulting from mixing or surface treating a product of claim 14 with a sufficient amount of a doping agent so as to reduce the surface resistivity of the product to a value lower than about 100,000 megohm/cm$^2$.

26. A product of claim 25 wherein said doping agent is antimony pentafluoride.

* * * * *